May 19, 1953  H. R. EVANS  2,638,607
ADJUSTABLE LEG FOR BEDS AND THE LIKE
Filed May 11, 1949  2 Sheets-Sheet 1

INVENTOR
Homer R. Evans
BY
ATTORNEY

May 19, 1953  H. R. EVANS  2,638,607
ADJUSTABLE LEG FOR BEDS AND THE LIKE
Filed May 11, 1949  2 Sheets-Sheet 2
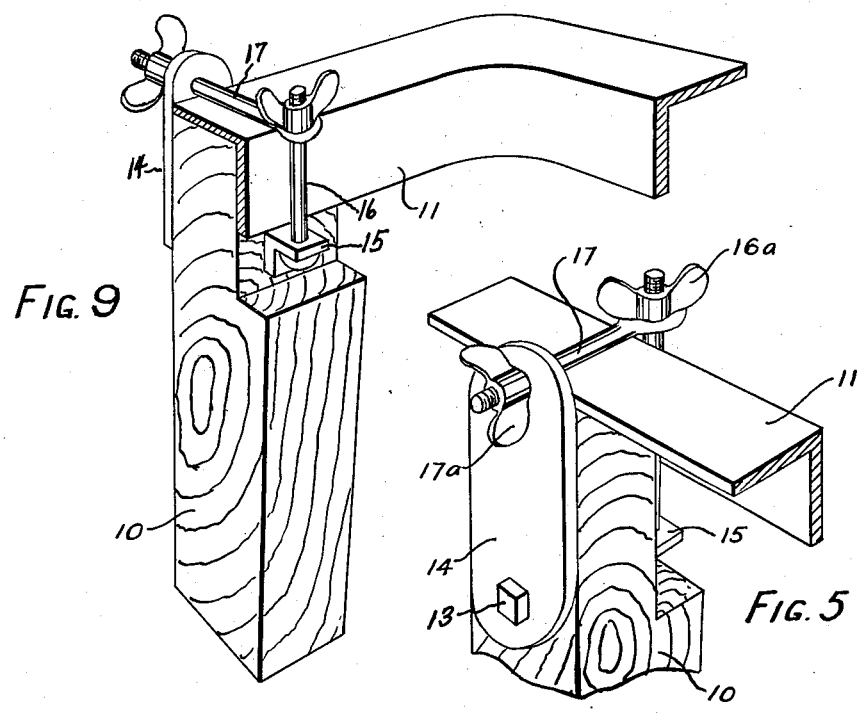
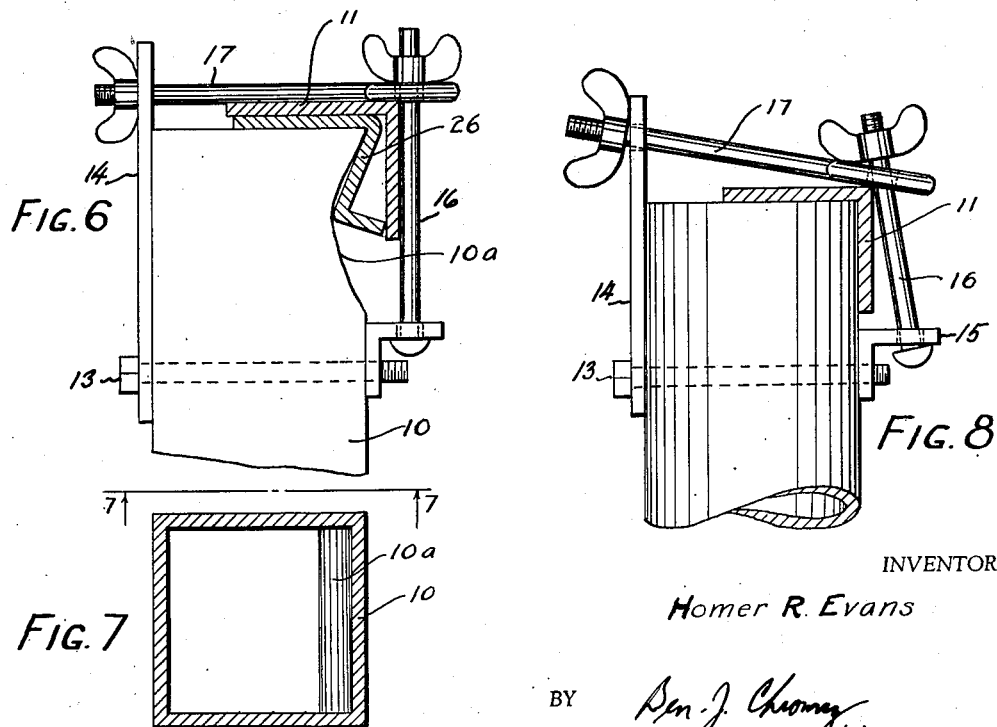
INVENTOR
Homer R. Evans
BY
ATTORNEY Patented May 19, 1953

2,638,607

UNITED STATES PATENT OFFICE 2,638,607

ADJUSTABLE LEG FOR BEDS AND THE LIKE

Homer R. Evans, Silver Spring, Md.

Application May 11, 1949, Serial No. 92,658

8 Claims. (Cl. 5—310)

This invention relates to improvements in legs of the type adapted to be attached to bed springs, couches and the like.

An object of this invention is to provide improved legs that may be attached to bed springs so as to provide a bed of the "Hollywood" type.

Another object of this invention is to provide improved supporting legs for beds, couches and the like, said legs being readily and quickly attachable to the bed or couch to form a strong and rigid connection therewith.

Still another object of this invention is to provide improved legs that may be readily and quickly attached to bed springs and may be adjusted so as to be vertical even if the frame of the bed springs is bent or warped.

These and other objects will be set forth in detail in the following specification and claims and in the accompanying drawings.

In accordance with this invention there is provided an improved supporting leg that may be readily and quickly attached to beds, bed springs and couches to provide support therefor. In the preferred form of this invention the leg is provided with an arrangement whereby it may be employed on beds, couches and bed springs even though the frames of these are bent or warped. The improved leg of this invention may be readily and quickly adjusted so that should the frame with which it is employed become bent or warped in use or during moving, the legs employed with such frame may be adjusted to compensate for deformities in the frame.

Further details of this invention will be set forth in the following specification when read in conjunction with the drawing in which briefly:

Fig. 5 is a perspective view of the embodiment of this invention shown in Fig. 1;

Fig. 6 is a side view of a leg embodying features of this invention, said leg made from a rectangular tubular element;

Fig. 7 is a sectional view taken along the line 7—7 of Fig. 6;

Fig. 8 is a view showing a leg made in accordance with this invention, said leg being of tubular metallic material and Fig. 9 is a perspective view showing a leg made in accordance with this invention attached to an angle iron frame that is not warped or bent.

Figure 2:
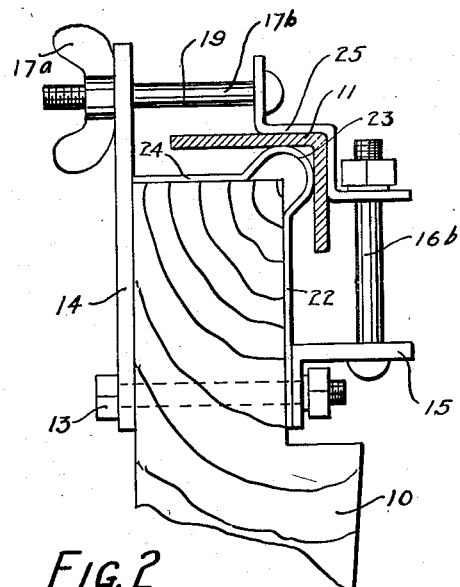
Fig. 2 is a fragmentary view of a leg made in accordance with this invention attached to an angle iron frame, said leg employing an arcuate shim for engaging the frame.

Referring to the drawings in detail there are illustrated several embodiments showing different forms of the improved leg of my invention attached to angle iron frames both with and without abnormal deformities. In describing the invention corresponding parts shown in the various views will be designated by like reference numerals. Throughout the various views the leg is designated by the reference numeral 10 and the angle iron frame of the bed, couch or bed springs is designated by the reference numeral 11.

Figure 1:
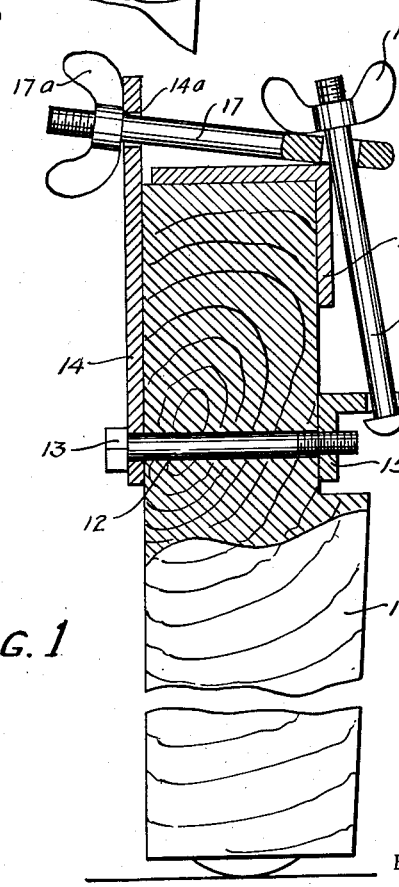
Fig. 1 is a view partially in section of a leg attached to an angle iron frame, said leg embodying features of this invention.

In Fig. 1 the leg 10 is provided with a bolt hole 12 in which the bolt 13 is lodged. This bolt 13 is employed for fastening the strap-like member 14 on one side of the upper part of the leg 10. One end of the bolt 13 is threaded into the angle element 15 which functions as a nut for this bolt and also as an angle bracket to receive the bolt 16. The bolt 16 also engages the eye of the eye bolt 17. The eye bolt 17 passes through a hole 14a formed in the upper end of the member 14. The top of the leg 10 fits into the angle of the angle iron frame 11 which in this case is shown in a normal shape without any deformity. The bolt 16 and the eye bolt 17 are employed for the purpose of firmly clamping the angle iron frame 11 to the top of the leg 10 and this is done by suitably tightening the wing nuts 16a and 17a of the bolts 16 and 17 respectively.

Figure 3:
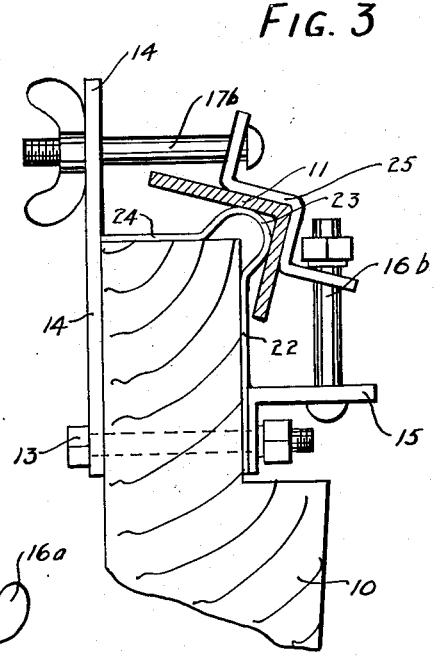
Fig. 3 is a view of a leg embodying feature of this invention, as shown in Fig. 2, attached to an angle iron frame that is twisted.
Figure 4:
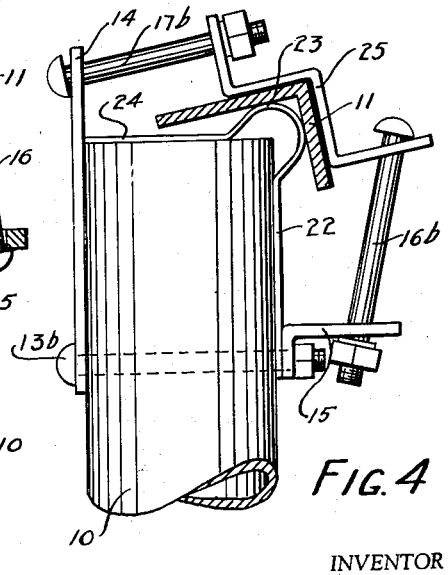
Fig. 4 is a view of a tubular iron leg adapted to be attached to an angle iron frame in the same manner as the legs shown in Figs. 2 and 3 and being adjustable to fit frames twisted either clockwise or counterclockwise.

In cases where the angle iron frame 11 is bent or twisted as shown in Figs. 3 and 4 the leg 10 may still be employed with these deformed frames by employing a shim 22 having an arcuate section 23 that is adapted to engage the inner surfaces of the angle iron frame 11. This shim 22 may also be employed with a frame 11 that is not bent or twisted as shown in Fig. 2. Furthermore this shim 22 may be employed with frames that are twisted either in the clockwise or counterclockwise directions as shown in Figs. 3 and 4 respectively. On the other hand this shim may also be employed with frames in which the angle of the frame has been deformed so that this angle is either less than or greater than 90 degrees.

The shim 22 having a central arcuate section 23 is attached to the top of the leg and is held in position by the bolt 13 which passes through a suitable hole formed in the lower part of this shim and clamps portions of this shim against the side of the leg. The arcuate portion 23 of the shim 22 extends up and away from a top edge of the leg 10 that it is positioned in the angle of the frame 11 and this arcuate portion engages inner surfaces of the angle iron frame 11.

The flat top portion 24 of the shim 22 rests firmly on the top of the leg 10 and abuts against the inside of the strap-like member 14. Thus the shim 22 is rigidly held in place on the leg by the bolt 13 and the strap-like member 14 when the frame 11 is clamped against the arcuate portion 23 by the bolts 16b and 17b cooperating with the angle member 25 that is shaped to fit over the outside of the frame 11. The angle member 25 is provided with extensions which have holes formed therein adapted to receive the bolts 16b and 17b so that this angle member may be clamped against the outside of the frame 11. By adjusting the bolts 16b and 17b, that is, either tightening or loosening these respective bolts the arcuate portion of the shim 22 may be rotated with respect to the frame 11. As a result the leg 10 may be adjusted to assume different angles with respect to this frame and if the frame is bent or twisted the leg 10 may be adjusted to compensate for these deformities. In practice where it is desired to make a "Hollywood" bed, for example, by using a set of bed springs and six of these legs, if the frame of the bed springs is bent or twisted so that part of the frame assumes the angular position shown in Fig. 3, for example, with respect to the top plane of the bed springs, then the legs may be rotated slightly with respect to the frame as shown in Fig. 3 so that the legs assume an angle of substantially 90 degrees with respect to the top plane of the bed springs. Likewise if the frame is twisted as shown in Fig. 4 the legs may also adjusted to compensate for this deformity. It is of course obvious that part of the frame may be twisted in one direction and part in another direction and part of it may be substantially normal. The legs of this invention may be used with equal efficiency in a situation of this type also.

In Fig. 5 is shown a perspective view of an embodiment of this invention employing a wooden leg. The strap 14 shown in this view is preferably as wide as the leg 10 in order to provide the required strength and also in order to minimize the compression of the end of the wooden leg by the action of the bolt 17 and the strap 14 when the wing nut 17a is tightened on the bolt.

In Figs. 6 and 7 there is illustrated a frame of this invention employing a rectangular iron or steel leg 10. A portion of the top of this leg 10 is pressed in as shown at 10a so as to accommodate shims 26 of different configurations. In the embodiment illustrated in Fig. 6 the frame member 11 is shown without any bending or deformities and for this purpose the shim 26 may take a substantially Z shaped configuration.

In Fig. 8 there is illustrated a tubular leg made of steel or other metallic or plastic material attached to the frame 11 by means of bolts 16 and 17 substantially the same as the rectangular wooden leg shown in Fig. 1. Fig. 9 shows a wooden leg such as shown in Fig. 1, shown in perspective and attached near the corner of the frame 11. The legs 10 shown in the various views are adapted to be used with the different types of shims illustrated to compensate for frame irregularities of different kinds, as pointed out above and still permit the legs to assume a normal vertical position when they are attached to the frame in use.

While I have described this invention in detail with respect to certain embodiments thereof it is not desired to limit the invention to those details except in so far as they may be set forth in the appended claims.

What I claim is:

1. An article of furniture comprising a frame, a supporting leg and means for attaching said leg to said frame comprising a bolt passing through the upper portion of said leg, a strap-like member and an angle bracket attached to said leg by said bolt, said strap-like member being positioned on one side of said leg and said angle bracket being positioned on another side of said leg, said strap-like member extending a short distance above said leg and having a hole adjacent to the top thereof, means including a pair of adjustable members linked together to receive said angle iron frame member and to clamp inner surfaces to said angle iron frame member against a top corner of said leg.

2. An article of furniture comprising a frame, a supporting leg and means for attaching said leg to said frame comprising a bolt passing through the upper portion of said leg, a strap-like member and an angle bracket attached to said leg by said bolt, said strap-like member being positioned on one side of said leg and said angle bracket being positioned on another side of said leg, said strap-like member extending a short distance above said leg, and means including a pair of adjustable members linked together between said strap-like member and said angle bracket to receive said angle iron frame member and to clamp inner surfaces of said angle iron frame member against a top corner of said leg.

3. An article of furniture comprising a frame, a supporting leg and means detachably securing said leg to said frame comprising a bolt passing through the upper portion of said leg, a strap-like member and an angle bracket attached to said leg by said bolt, said strap-like member being positioned on one side of said leg and angle bracket being positioned on other side of said leg, said strap-like member extending a short distance above said leg, and an adjustable linkage connecting said strap-like member and said angle bracket embracing the outside of said angle iron frame member clamping a corner of said leg against the inner surfaces of said angle iron frame member.

4. An article of manufacture comprising an angle iron frame, a leg, means providing a rounded-off bearing to the top of said leg, means for adjustably attaching said leg to said angle iron frame, a strap-like member attached to one side of said leg and extending a short distance above the top thereof, an angle bracket attached to the other side of said leg and extending a short distance away from said leg, an adjustable linkage means attached between said strap-like member and said angle bracket, said adjustable linkage means being adapted to clamp said angle iron frame against said rounded off bearing provided to the top portion of said leg at different angles depending upon the adjustment of said adjustable linkage means.

5. An article of manufacture comprising an angle iron frame, a leg, means for adjustably attaching said leg to said angle iron frame, said means comprising a strap-like member attached to one side of said leg end extending a short distance above the top thereof, an angle bracket attached to the other side of said leg and extending a short distance away from said leg, a bearing member comprising an arcuate portion positioned over a top edge of said leg for engaging surfaces of the inside of said iron frame member and means engaging the outside of said angle iron frame member directly above said arcuate member, said last mentioned means being adjustably attached to said strap-like member and said bracket member so that said angle iron frame member may be rotatably adjusted on said arcuate member and clamped thereon.

6. An article of manufacture comprising an angle iron frame, a leg, means for adjustably attaching said leg to said angle iron frame, said means comprising a strap-like member attached to one side of said leg and extending a short distance above the top thereof, an angle bracket attached to the other side of said leg and extending a short distance away from said leg, a bearing member comprising an arcuate portion positioned over a top edge of said leg for engaging surfaces of the inside of said angle iron frame member, said bearing member having a portion extending over the top of said leg to said strap-like member and also having a portion extending down the side of said leg to said angle bracket for bracing said arcuate portion, and means engaging the outside of said angle iron frame member directly above said arcuate member, said last mentioned means being adjustably attached to said strap-like member and said bracket member so that said angle iron frame member may be rotatably adjusted on said arcuate member and clamped thereon.

7. An article of manufacture comprising an angle iron frame, a leg, means for adjustably attaching said leg to said angle iron frame, said means comprising a strap-like member attached to one side of said leg and extending a short distance above the top thereof, an angle bracket attached to the other side of said leg and extending a short distance away from said leg, a bearing member comprising an arcuate portion positioned over a top edge of said leg for engaging surfaces of the inside of said angle iron frame member, said bearing member having a portion extending over the top of said leg to said strap-like member and also having a portion extending down the side of said leg to said angle bracket for bracing said arcuate portion, an angle member engaging the outside of said angle iron frame member directly above said arcuate member, and bolts adjustably attached to said strap-like member, said angle member and said bracket member for clamping said angle iron frame member against said arcuate member.

8. In devices of the class described the combination of an angle iron frame member, a leg, a rounded-off bearing at the top of said leg for engaging the inside of said angle iron frame, an angle clamping member for engaging the outside of said angle iron frame directly over said rounded-off bearing, adjustable means at the top of said leg and adjustable means attached to the side of said leg for adjustably holding said angle clamping member, both said adjustable means cooperating to clamp said angle iron frame against said rounded-off bearing at the top of said leg at different angles depending upon the adjustment thereof.

HOMER R. EVANS.

References Cited in the file of this patent

UNITED STATES PATENTS

| Number | Name | Date |
|--------|------|------|
| 2,476,605 | Jacob | July 19, 1949 |
| 2,484,969 | Stacy | Oct. 18, 1949 |